United States Patent [19]

Yamamoto et al.

[11] 3,721,671
[45] Mar. 20, 1973

[54] NOVEL QUINAZOLINONE DERIVATIVES 2-ALKYL-3-(3'-METHYLPYRIDINE-2'-YL)-5-CHLORO-4(3H)-QUINAZOLINONE

[75] Inventors: Hisao Yamamoto; Shigeho Inaba, both of Nishinomiya; Seitetsu Arasaki; Isamu Maruyama, both of Minoo; Kei Takahashi, Takarazuka; Chiharu Saigo; Shigeru Sakai, both of Toyonaka, all of Japan

[73] Assignee: Sumitomo Chemical Co., Ltd., Osaka, Japan

[22] Filed: May 4, 1970

[21] Appl. No.: 34,587

[30] Foreign Application Priority Data

Jan. 23, 1967 Japan..................42/4725

Related U.S. Application Data

[63] Continuation-in-part of Ser. No. 683,813, Nov. 17, 1967, abandoned.

[52] U.S. Cl. ....260/256.4 Q, 260/296 R, 260/518 A, 424/251
[51] Int. Cl. .................................C07d 51/48
[58] Field of Search.................260/256.4 Q

[56] References Cited

UNITED STATES PATENTS 3,382,246  5/1968  Suter et al. ...................260/256.4
3,418,319  12/1968  Heusner et al. ................260/256.4

*Primary Examiner*—Alex Mazel
*Assistant Examiner*—R. J. Gallagher
*Attorney*—Wenderoth, Lind & Ponack

[57] ABSTRACT

Novel quinazolinone derivatives, which exhibit central nervous system depressing activities such as tranquilizing, sedative, muscle relaxing, spasmolytic and barbital potentiating activities with low toxicity, having the formula,

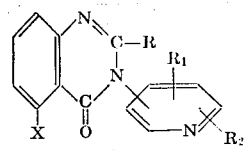

wherein R is hydrogen, lower alkyl or halogenated lower alkyl, $R_1$ is hydrogen, halogen, lower alkyl, halogenated lower alkyl, lower alkoxy or nitro, $R_2$ is halogen, lower alkyl, halogenated lower alkyl, lower alkoxy or nitro, and X is chlorine or bromine are prepared by reacting an N-acylanthranilic acid derivative of the formula

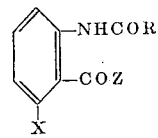

wherein R and X have the same meanings as above and Z is hydroxyl, lower alkoxy, halogen or a group —OY where Y is an alkali metal, with an aminopyridine derivative of the formula

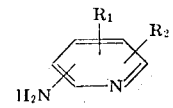

wherein $R_1$ and $R_2$ have the same meanings as defined above.

3 Claims, No Drawings

NOVEL QUINAZOLINONE DERIVATIVES 2-ALKYL-3-(3'-METHYLPYRIDINE-2'-YL)-5-CHLORO-4(3H)-QUINAZOLINONE

This application is a continuation-in-part application of Ser. No. 683,813, filed Nov. 17, 1967, now abandoned.

The present invention relates to novel quinazolinone derivatives, and to pharmaceutical compositions containing such derivatives.

More particularly, the present invention pertains to novel quinazolinone derivatives, which are useful for medicines, of the formula,

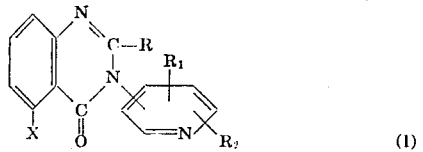

wherein R is hydrogen, lower alkyl or halogenated lower alkyl, $R_1$ is hydrogen, halogen, lower alkyl, halogenated lower alkyl, lower alkoxy or nitro, $R_2$ is halogen, lower alkyl, halogenated lower alkyl, lower alkoxy or nitro, and X is chlorine or bromine, and pharmaceutical compositions containing the same.

The quinazolinone derivatives of the present invention are produced by reacting an N-acylanthranilic acid derivative of the formula,

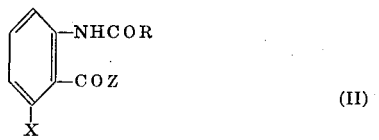

wherein R and X have the same meanings as defined above, and

Z is hydroxyl, lower alkoxy, halogen or a group OY where Y is an alkali metal, with an aminopyridine derivative of the formula

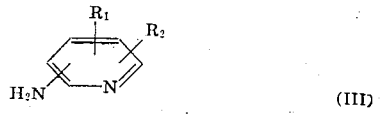

wherein $R_1$ and $R_2$ have the same meanings as defined above.

The present quinazolinone derivatives I are novel and have not been reported in any literature. They exhibit central nervous system depressing activities such as tranquilizing, sedative, muscle relaxing, spasmolytic and barbital potentiating activities with low toxicity, even when orally administered. Thus, they are useful as medicaments.

The objective products may be produced advantageously by reacting an N-acylanthranilic acid derivative II with an aminopyridine derivative III in an inert solvent such as benzene, toluene, xylene, dioxane, nitrobenzene, pyridine or dimethylformamide, in the presence of phosphorus trichloride, phosphorus pentachloride, phosphorus oxychloride, polyphosphoric acid or the like.

The N-acylanthranilic acid derivative II are exemplified by 2-formamido-6-chlorobenzoic acid, 2-formamido-6-bromobenzoic acid, 2-acetamido-6-chlorobenzoic acid, 2-acetamido-6-bromobenzoic acid, 2-propionamido-6-chlorobenzoic acid, 2-propionamido-6-bromobenzoic acid, 2-butyrylamido-6-chlorobenzoic acid, 2-butyrylamido-6-bromobenzoic acid, 2-isobutyrylamido-6-chlorobenzoic acid, 2-isobutyrylamido-6-bromobenzoic acid, 2-valerylamido-6-chlorobenzoic acid, 2-valerylamido-6-bromobenzoic acid, 2-isovalerylamido-6-chlorobenzoic acid, 2-isovalerylamido-6-bromobenzoic acid, 2-chloroacetamido-6-chlorobenzoic acid, 2-chloroacetamido-6-bromobenzoic acid, 2-chloropropionamido-6-chlorobenzoic acid, 2-chloropropionamido-6-bromobenzoic acid, 2-chlorobutyryl-amido-6-chlorobenzoic acid, 2-chlorobutyrylamido-6-bromobenzoic acid, and their alkali metal salts, their acid halides such as acid chlorides, their esters such as methyl esters, ethyl esters and t-butyl esters, etc.

Examples of the aminopyridine derivative (III) are 3-, 4-, 5- or 6-methyl-2-aminopyridine, 4-ethyl-2-aminopyridine, 2-, 4-, 5- or 6-methyl-3-aminopyridine, 2- or 3-methyl-4-aminopyridine, 5-chloro-2-aminopyridine, 5-bromo-2-aminopyridine, 5- or 6-chloro-3-aminopyridine, 3- or 5-nitro-2-aminopyridine, 3-nitro-4-aminopyridine, 6-methoxy-3-aminopyridine, 4,6-dimethyl-2-aminopyridine, 2,6-dimethyl-3-aminopyridine, 3-ethyl-6-methyl-2-aminopyridine, 3,5-dichloro-2-aminopyridine, 3,5-dibromo-2-aminopyridine, 3,5-dinitro-4-aminopyridine, 3-methyl-5-nitro-2-aminopyridine, 4-methyl-5-nitro-2-aminopyridine, 3-methyl-5-nitro-2-aminopyridine, 5-nitro-3-bromo-2-aminopyridine, 3-trifluoromethyl-2-aminopyridine, etc.

Examples of the quinazolinone derivatives I of the present invention include 2-methyl-3-(5'-chloropyridine-2'-yl)-5-chloro-4(3H)-quinazolinone, 2-methyl-3-(5'-bromo-pyridine-2'-yl)-5-chloro-4(3H)-quinazolinone, 2-methyl-3-(6'-methylpyridine-2'-yl)-5-chloro-4(3H)-quinazolinone, 2-ethyl-3-(3'-methylpyridine-2'-yl)-5-chloro-4(3H)-quinazolinone, 2-n-propyl-3-(3'-methylpyridine-2'-yl)-5-chloro-4 (3H)-quinazolinone, 2-isopropyl-3-(3'-methylpyridine-2'-yl)-5-chloro-4(3H)-quinazolinone, 2-n-butyl-3-(3'-methylpyridine-2'-yl)-5-chloro-4(3H)-quinazolinone, 2-isobutyl-3-(3'-methylpyridine-2'-yl)-5-chloro-4 (3H)-quinazolinone, 2-methyl-3-(4',6'-dimethyl-pyridine-2'-yl)-5-chloro-4(3H)-quinazolinone, 2-chloromethyl-3-(3'-methylpyridine-2'-yl)-5-chloro-4 (3H)-quinazolinone and their 5-bromo isomers, etc. These quinazolinone derivatives are found to be much more potent than known quinazolinone derivatives and 2,2-di (carbamoyloxymethyl) pentane in tranquilizing activity.

The quinzaolinone derivatives of the present invention may be utilized in treating such mental disturbances as neurosis, insomnia, anxiety and the like. They can be administered parenterally or orally in therapeutic dosage forms with the specific dosage adjusted to individual needs, that is, in solid or liquid dosage forms such as tablets, dragees, capsules, suspensions, solutions, elixirs and the like with suitable carriers. For example, a 10–100mg. dosage of 2-methyl-3-

(3'-methyl-pyridine-2'-yl)-5-chloro-4 (3H)-quinazolinone can be administered orally one to three times a day to treat psychosomatic disturbances in humans.

In order to show that the quinazolinone derivatives of the present invention are superior to known tranquilizing agents, the following experiments are presented.

I. EXPERIMENTAL

A. Toxicity, Hypnotic Action and Sedative Action

Each compound was administered to groups of 15–20 mice, 18–22 g in body weight, at five dose levels or more, and $LD_{50}$, $HD_{50}$ and $SD_{50}$ values were calculated as follows:

1. $LD_{50}$ (50 percent lethal dose) : The lethality was determined by the number of animals which died within 7 days following the administration of each compound, and was calculated by a regression line based on dosage and lethality according to the Litchfield-Wilcoxon method [1]=Litchfield and Wilcoxon; J. Phamacol. 96, 99 (1949).

2. $HD_{50}$ (50 percent hypnotic dose) : The hypnotic activity was determined based on the number of animals exhibiting loss of righting reflex for over 20 seconds, and calculated by the Litchfield-Wilcoxon method [1]=Litchfield and Wilcoxon; J. Phamacol. 96, 99 (1949).

3. $SD_{50}$ (50% sedative dose) : The motor activity of mice was determined based on the number of rotations in a rotating cage for 15 minutes after administering the compounds, and the number of animals which was less than one-half the rotating count in control (untreated) mice was used for calculation by the Litchfield-Wilcoxon method [1]=Litchfield and Wilcoxon; J. Phamacol. 96, 99 (1949).

B. Anti-convulsant effect of the test compounds.

1. Maximal electroshock seizures were induced by the technique of Swinyard et al. [2]=E. A. Swinyard, W. C. Brown and L. S. Goodman; J. Pharmacol. 106, 319 (1952). Tests were carried out with oral administration of compounds, each at a minimum of four dose levels, in groups of six mice. The animals were challenged with a maximal electroshock (25 mA, 0.15 sec.) delivered through corneal electrodes 30 minutes after administration of the test compound. The $ED_{50}$, that dose which prevented hind limb extension in 50 percent of the animals, was calculated by probit analysis.

2. Prevention of pentylenetetrazol-induced convulsions was carried out in groups of 6 animals at a minimum of four dose levels according to the method of Everett and Richards [3]=G. M. Everett and R. K. Richards; J. Pharmacol. 81, 402 (1944). The animals were challenged with pentylenetetrazol, 110 mg/kg intraperitoneally, 30 minutes after the oral administration of the test compound. The $ED_{50}$ was calculated by probit analysis, taking into account prevention of both convulsions and death.

II. RESULTS

Results are summarized as shown in the following Tables.

Table 1. Toxicity, Hypnotic Action and Sedative Action of Compounds in Mice

| Compounds | Route | $LD_{50}$ (mg./kg.) | $HD_{50}$ (mg./kg.) | $SD_{50}$ (mg./kg.) | $HD_{50}/SD_{50}$ |
|---|---|---|---|---|---|
| Quinazolinone derivatives of the present invention: | | | | | |
| 2-methyl-3-(3'-methyl-pyridine-2'-yl)-5-chloro-4(3H)-quinazolinone | I.p. | 890(748–1,059) | 220(172–282) | 33(25–44) | 6.7 |
| | P.o. | 900 ca. | 290(232–363) | 48(25–91) | 6.0 |
| 2-ethyl-3-(3'-methyl-pyridine-2'-yl)-5-chloro-4(3H)-quinazolinone | I.p. | 360(303–428) | <500 | 25(15–44) | >20 |
| | P.o. | 620(517–744) | <600 | 67(37–120) | >10 |
| Known compounds: | | | | | |
| 2-ethyl-3-(5'-chloro-2'-pyridyl)-4(3H)-quinazolinone | P.o. | <500 | 148 | 70 | 2.1 |
| 2-methyl-3-(3'-methyl-2'-pyridyl)-4(3H)-quinazolinone | P.o. | <500 | 143 | 82 | 1.5 |
| 2-methyl-3-(5'-bromo-2'-pyridyl)-4(3H)-quinazolinone | P.o. | <500 | 158 | 68 | 2.3 |
| 2,2-di(carbamoyloxymethyl) pentane | I.p. | 740 | 285 | 260 | 1.1 |
| | P.o. | 1,610 | 405 | 350 | 1.2 |

Note.—Symbol < indicates "less than".

TABLE 2. ANTI-CONVULSANT ACTIVITY OF COMPOUNDS IN MICE

| Compounds | Anti-electroshock seizure (mg/kg) per os | Anti-pentylene-tetrazol (mg/kg) per os |
|---|---|---|
| Quinazolinone derivatives of the present invention: | | |
| 2-methyl-3-(3'-methyl-pyridine-2'-yl)-5-chloro-4(3H)-quinazolinone | 38 (25–68) | 15 (10–17) |
| 2-ethyl-3-(3'-methyl-pyridine-2'-yl)-5-chloro-4(3H)-quinazolinone | 46 | 25 |
| Known Compound: 2-ethyl-3-(5'-chloro-2'-pyridyl)-4(3H)-quinazolinone | 133 | 63 |

It is clear from the Tables 1 and 2 that 1. quinazolinone derivatives of the present invention are excellent in sedative action but low in toxicity and hypnotic action, and $HD_{50}/SD_{50}$-values thereof are smaller than those of the known quinazolinone derivatives and 2,2-di(carbamoyloxy-butyl)pentane, and 2. quinazolinone derivatives of the present invention exhibit greater anti-convulsant activity than the known quinazolinone derivatives.

Further, 2-methyl-3-(3'-methylpyridine-2'-yl)-5-chloro-4(3H)-quinazolinone of the present invention had hexobarbital potentiation activity equal to that of 2,2-di(carbamoyloxymethyl)pentane.

Practical embodiments of this invention are presented in the following examples, which are in-

EXAMPLE 1

To a mixture of 5 g. of 2-acetamido-6-chlorobenzoic acid and 5.3 g. of 2-amino-5-chloropyridine in 80 ml. of xylene was added dropwise a solution of 1.5 g. of phosphorus trichloride in 20 ml. of xylene under cooling. The resultant mixture was heated under reflux for 25 hours. After cooling, .65 ml. of 10 percent aqueous solution of sodium carbonate was added to the reaction mixture, and the mixture was stirred. The insoluble material was collected by filtration, washed with water and xylene in order and dried to give 3.5 g. of 2-methyl-3-(5'-chloropyridine-2'-yl)-5-chloro-4(3H)-quinazolinone melting at 191° to 192°C. Recrystallization from ethanol gave white crystals melting at 193°C.

Anal. Calcd. for $C_{14}H_9Cl_2N_3O$: C, 54.90%; N, 13.73%; Cl, 23.20%. Found: C, 55.07%; N, 13.57%; Cl 23.04%.

IR: $\nu_{max}^{Nujol}$ 1698, 1622, 1604 cm$^{-1}$.
UV: $\lambda_{max}^{EtOH}$ 232, 271, 279sh, 305sh, 317, 329 m$\mu$.

EXAMPLE 2

To a mixture of 10.7 g. of 2-acetamido-6-chlorobenzoic acid and 9.5 g. of 2-amino-5-bromopyridine in 125 ml. of xylene was added dropwise a solution of 2.9 g. of phosphorus trichloride in 10 ml. of xylene under cooling, and the resultant mixture was heated under reflux for 17.5 hours. After cooling, 50 ml. of 10 percent aqueous solution of potassium carbonate was added to the reaction mixture, and then the mixture was stirred. The insoluble material was collected by filtration, washed with water and xylene in order and dried to give 13.3 g. of 2-methyl-3-(5'-bromopyridine-2'-yl)-5-chloro-4(3H)-quinazolinone, which was recrystallized from benzene to give pale green prisms melting at 219° to 219.5°C.

Anal. Calcd. for $C_{14}H_9ClBrN_3O$: C, 47.96%; N, 12.14%; halogen, 20.22%. Found: C, 47.90%; N, 11.99%; halogen, 20.09%.

IR: $\nu_{max}^{Nujol}$ 1690, 1620, 1600 cm$^{-1}$.
UV: $\lambda_{max}^{EtOH}$ 234, 271, 279, 317, 327 m$\mu$.

EXAMPLE 3

To a mixture of 5 g. of 2-acetamido-6-chlorobenzoic acid and 2.8 g. of 2-amino-6-methylpyridine in 80 ml. of xylene was added dropwise a solution of 1.5 g. of phosphorus trichloride in 15 ml. of xylene under cooling with ice, and the resultant mixture was heated under reflux for 25 hours. After cooling, 10 percent aqueous solution of sodium carbonate was added to the reaction mixture, and the mixture was stirred. The insoluble material was collected by filtration, washed with water and xylene in order and dried to give 3.9 g. of 2-methyl-3-(6'-methylpyridine-2'-yl)-5-chloro-4(3H)-quinazolinone melting at 193° to 194°C. Recrystallization from ethanol gave crystals melting at 194° to 195°C. From the mother liquor, an additional 1.1 g. of product was obtained.

Anal. Calcd. for $C_{15}H_{12}ClN_3O$: C, 63.05%; N, 14.79%; Cl, 12.43%. Found: C, 62.79%; N, 14.79%; Cl, 12.43%. Found: C, 62.79%; N, 14.65%; Cl, 25.45%.

IR: $\nu_{max}^{Nujol}$ 1698, 1622, 1604 cm$^{-1}$.
UV: $\lambda_{max}^{EtOH}$ 232, 271, 279sh, 305sh, 317, 329 m$\mu$.

EXAMPLE 4

To a mixture of 5 g. of 2-acetamido-6-chlorobenzoic acid and 2.8 g. of 2-amino-3-methylpyridine in 80 ml. of xylene was added dropwise a solution of 1.5 g. of phosphorus trichloride in 15 ml. of xylene under cooling with ice, and the resultant mixture was heated under reflux for 25 hours. After cooling, 10 percent aqueous solution of sodium carbonate was added to the reaction mixture, and the mixture was stirred. The xylene layer was separated, dried over anhydrous potassium carbonate and concentrated under reduced pressure. The oily residue was solidified on trituration with water to give a solid. The solid was collected by filtration, washed with water and dried to give 4.4 g. of crude 2-methyl-3-(3'-methylpyridine-2'-yl)-5-chloro-4(3H)-quinazolinone. Recrystallization from ethanol give pale yellow prisms melting at 159° to 160°C.

Anal. Calcd. for $C_{15}H_{12}ClN_3O$: C, 63.05%; N, 14.71%; Cl, 12.43%. Found: C, 62.85%; N, 14.78%; Cl, 12.29%.

IR: $\nu_{max}^{Nujol}$ 1675, 1615, 1600 cm$^{-1}$.
UV: $\lambda_{max}^{EtOH}$ 232, 270, 280, 317, 330 m$\mu$.

EXAMPLE 5

To a mixture of 5 g. of 2-acetamido-6-chlorobenzoic acid and 2.8 g. of 2-amino-3-methylpyridine in 80 ml. of xylene was added dropwise a solution of 1.5 g. of phosphorus trichloride in 15 ml. of xylene under cooling, and the resultant mixture was heated under reflux for 15 hours. After cooling, 10 g aqueous solution of sodium carbonate was added to the reaction mixture, and the mixture was stirred. The insoluble material is collected by filtration, washed with water and xylene in order and dried to give 2.9 g. of 2-methyl-3-(5'-methyl-pyridine-2'-yl)--5-chloro-4(3H)-quinazolinone melting at 181° to 182°C. Recrystallization from ethanol gave crystals melting at 184° to 185°C. From the mother liquor, an additional 1.7 g. of product was obtained.

Anal. Calcd. for $C_{15}H_{12}ClN_3O$: C, 63.05%; N, 14.71%; Cl, 12.43%. Found: C, 63.34%; N, 14.84%; Cl, 12.64%.

IR: $\nu_{max}^{Nujol}$ 1685, 1613, 1590 cm$^{-1}$.
UV: $\lambda_{max}^{EtOH}$ 233, 271, 280, 305sh, 317, 328 m$\mu$.

EXAMPLE 6

To a mixture of 5 g. of 2-acetamido-6-chlorobenzoic acid and 3.2 g. of 2-amino-4,6-dimethylpyridine in 80 ml. of xylene was added dropwise a solution of 1.5 g. of phosphorus trichloride in 15 ml. of xylene under cooling, and the resultant mixture was heated under reflux for 15 hours. After cooling, 10 percent aqueous solution of sodium carbonate was added to the reaction mixture, and the mixture was stirred. The xylene layer was separated, dried over anhydrous potassium carbonate and concentrated under reduced pressure. The oily residue was triturated with a small amount of ethanol to solidify. The solid was collected by filtration and dried to give 2-methyl-3-(4",6'-dimethylpyridine-2'-yl)-5-chloro-4(3H-quinazolinone (2.5 g.). Recrystallization from ethanol gave crystals melting at 156° to 157°C.

Anal. Calcd. for $C_{16}H_{14}ClN_3O$: C, 64.11%; N, 14.02%; Cl, 11.85%. Found: C, 63.94%; N, 13.96%; Cl, 12.00%.

IR: $\nu_{max}^{Nujol}$ 1685, 1613, 1596 cm$^{-1}$.
UV: $\lambda_{max}^{EtOH}$ 232, 270, 280, 516, 329 m$\mu$.

EXAMPLE 7

According to the similar procedure of Example 6, there was obtained 2-methyl-3-(6'-methoxypyridine-3'-yl)-5-chloro-4(3H)-quinazolinone melting at 122° to 124°C. from 5.3 g. of 2-acetamido-6-chlorobenzoic acid and 3.5 g. of 3-amino-6-methoxypyridine.

Anal. Calcd. for $C_{15}H_{12}ClN_3O_2$: C, 59.71%; N, 13.93%; Cl, 11.75%. Found: C, 59.70%; N, 13.51%; Cl, 11.31%.

IR: $\nu_{max}^{Nujol}$ 1683, 1614, 1600 cm$^{-1}$.

UV: $\lambda_{max}^{EtOH}$ 232, 272, 280, 305, 317, 329 m$\mu$.

EXAMPLE 8

To a mixture of 2-acetamido-6-chlorobenzoic acid (5.3 g.) and 3.6 g. of 3-amino-2-chloropyridine in 100 ml. of xylene was added dropwise a solution of 1.5 g. of phosphorus trichloride in 10 ml. of xylene under cooling with ice, and the resultant mixture was heated under reflux for 7 hours. After cooling, 10 percent aqueous solution of sodium carbonate was added to the reaction mixture, and the mixture was stirred. The insoluble material was collected by filtration, washed with water and xylene in order and dried to give 4.6 g. of crude 2-methyl-3-(2'-chloropyridine-3'-yl)-5-chloro-4 (3H)-quinazolinone melting at 150° to 151.5°C. Recrystallization from ethanol gave crystals melting at 156.0° to 156.5°C. From the mother liquor an additional 1.8 g. of product was obtained. The melting point was 156.0° to 156.5°C.

Anal. Calcd. for $C_{14}H_9Cl_2N_3O$: C, 54.92%; N, 13.73%; Cl, 23.16%. Found: C, 54.82%; N, 13.54%; Cl, 23.13%.

IR: $\nu_{max}^{Nujol}$ 1685, 1619, 1599 cm$^{-1}$.

UV: $\lambda_{max}^{EtOH}$ 232, 270, 279, 305, 316, 329 $\mu$.

EXAMPLE 9

To a mixture of 6.8 g. of 2-propionamido-6-chlorobenzoic acid and 3.6 g. of 2-amino-3-methylpyridine in 110 ml. of xylene was added dropwise a solution of 1.9 g. of phosphorus trichloride in 10 ml. of xylene under cooling with ice, and the mixture was heated under reflux for 13 hours. After cooling, 10 percent aqueous sodium carbonate solution was added to the reaction mixture. The was stirred and filtered. The xylene layer was separated from the filtrate, dried over anhydrous sodium sulfate and concentrated under reduced pressure.

The oily residue was washed with water, and crystallized on adding ethanol and cooling to give 2-ethyl-3-(3'-methylpyridine-2'-yl)-5-chloro-4(3H)-quinazolinone, which was recrystallized from ether-hexane, m.p. 139°-140°C.

Anal. Calculated for $C_{16}H_{14}ClN_3O$: C, 64.16%; H, 4.71%; N, 14.03%; Cl, 11.84%. Found: C, 64.25%; H, 4.62%; N, 14.15%; Cl, 12.04%

IR: $\nu_{max}^{Nujol}$ 1680, 1613, 1599, 1575 cm$^{-1}$

EXAMPLE 10

To a mixture of 5 g. of 2-acetamido-6-chlorobenzoic acid and 2.8 g. of 2-amino-4-methylpyridine in 80 ml. of xylene was added dropwise a solution of 1.5 g. of phosphorus trichloride in 10 ml. of xylene under cooling with ice, and the mixture was heated under reflux for 15 hours. After cooling, 10 percent aqueous sodium carbonate solution was added to the reaction mixture was stirred. The organic layer was separated, dried over sodium sulfate, and the solvent was removed under reduced pressure to give 2-methyl-3-(4'-methylpyridine-2'-yl)-5-chloro-4(3H)-quinazolinone.

Recrystallization from benzene gave crystals melting at 183° to 184°C.

Anal Calcd. for $C_{15}H_{12}ClN_3O$: C, 63.05%; N, 14.71%, Cl, 12.43%. Found: C, 63.38%; N, 14.84%; Cl, 12.54%.

IR: $\nu_{max}^{Nujol}$ 1685, 1600, 1555 cm$^{-1}$.

The bromo compounds, i.e., containing a bromine atom in the 5-position, can be prepared via the same procedures, substituting the appropriate brominated compounds for chlorinated compounds where necessary.

What we claim is:

1. A compound of the formula

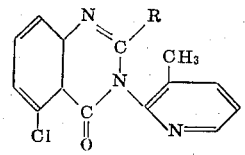

wherein R is methyl or ethyl.

2. A compound according to claim 1, namely 2-methyl-3-(3'-methylpyridine-2'-yl)-5-chloro-4(3H)-quinazolinone.

3. A compound according to claim 1, namely 2-ethyl-3-(3'-methylpyridine-2'-yl)-5-chloro-4(3H)-quinazolinone.

* * * * *